United States Patent
Weigert et al.

(10) Patent No.: US 10,480,983 B2
(45) Date of Patent: Nov. 19, 2019

(54) WASHER FLUID LEVEL DISPLAY CONTROL SYSTEMS AND METHODS

(71) Applicant: GM Global Technology Operations LLC, Detroit, MI (US)

(72) Inventors: Norman J. Weigert, Whitby (CA); Ralph G. Brown, Courtice (CA); Benjamin M. Ekola, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/910,249

(22) Filed: Mar. 2, 2018

(65) Prior Publication Data
US 2019/0271579 A1    Sep. 5, 2019

(51) Int. Cl.
*G01F 23/00* (2006.01)
*B60R 16/023* (2006.01)

(52) U.S. Cl.
CPC ...... *G01F 23/0092* (2013.01); *B60R 16/0231* (2013.01)

(58) Field of Classification Search
CPC .................................. A61B 1/00; G06Q 10/00
See application file for complete search history.

(56) References Cited

U.S. PATENT DOCUMENTS

| | | | | |
|---|---|---|---|---|
| 6,595,069 | B2* | 7/2003 | Frey | G01F 1/586 |
| | | | | 73/861.11 |
| 9,520,006 | B1* | 12/2016 | Sankovsky | G07C 5/006 |
| 2015/0379900 | A1* | 12/2015 | Samosky | G09B 23/285 |
| | | | | 434/262 |
| 2018/0087368 | A1* | 3/2018 | Mills | E21B 43/38 |

OTHER PUBLICATIONS

Gupta, Sidharth; "Sensor less Wash Fluid Detection in Automotive Application," SAE International, Tata Motors, Ltd., Published Apr. 8, 2013; 7 pages.

* cited by examiner

*Primary Examiner* — Shirley Lu (57) ABSTRACT

A washer fluid level indication system of a vehicle determines a present volume of washer fluid present within a washer fluid reservoir. A flowrate module is configured to determine a volume of washer fluid dispensed based on a measured voltage applied to a washer fluid pump and a predetermined volumetric flowrate of dispensing washer fluid calibrated based on a predetermined voltage. The flowrate module is configured to subtract the volume of washer fluid dispensed from the present volume. A level module is configured to determine a present level of washer fluid within the washer fluid reservoir based on the present volume and a predetermined maximum volume of the washer fluid reservoir. A display control module is configured to display the present level of washer fluid within the washer fluid reservoir using a washer level indicator.

20 Claims, 6 Drawing Sheets

WASHER FLUID LEVEL DISPLAY CONTROL SYSTEMS AND METHODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

A vehicle includes a front windshield that a driver looks through when driving the vehicle in a forward direction. Windshield wipers are mounted to windshield wiper arms. One or more windshield wiper motors actuate the windshield wiper arms to move the windshield wipers in predetermined paths across the front windshield. Movement of the windshield wipers may help clear matter from the front windshield.

Some vehicles may also include a rear windshield wiper for a rear windshield. The rear windshield wiper is also mounted to a windshield wiper arm. A rear windshield wiper motor actuates the rear windshield wiper arm to move the rear windshield wiper in a predetermined path across the rear windshield. Movement of the rear windshield wiper may help clear matter from the rear windshield.

SUMMARY

The present disclosure relates to windshield washer fluid systems of vehicles and more particularly to washer fluid level indication systems and methods for vehicles.

In a feature, a washer fluid level indication system of a vehicle is described. A volume module is configured to determine a present volume of washer fluid present within a washer fluid reservoir. A flowrate module is configured to determine a volume of washer fluid dispensed based on a measured voltage applied to a washer fluid pump and a predetermined volumetric flowrate of dispensing washer fluid calibrated based on a predetermined voltage. The flowrate module is configured to subtract the volume of washer fluid dispensed from the present volume. A level module is configured to determine a present level of washer fluid within the washer fluid reservoir based on the present volume and a predetermined maximum volume of the washer fluid reservoir. A display control module is configured to display the present level of washer fluid within the washer fluid reservoir using a washer level indicator.

In further features, the flowrate module is configured to: determine a present volumetric flowrate of washer fluid being dispensed based on the measured voltage applied to the washer fluid pump, the predetermined volumetric flowrate, and the predetermined voltage; and determine the volume of washer fluid dispensed based on the present volumetric flowrate.

In further features, the flowrate module is configured to determine the volume of washer fluid dispensed based on a mathematical integral of the present volumetric flowrate with respect to time.

In further features, the flowrate module is configured to: determine a voltage scalar based on the measured voltage applied to the washer fluid pump and the predetermined voltage; and determine the present volumetric flowrate as a function of the predetermined volumetric flowrate and the voltage scalar.

In further features, the flowrate module is configured to set the present volumetric flowrate based on the predetermined volumetric flowrate multiplied by the voltage scalar.

In further features, the flowrate module is configured to set the voltage scalar based on the measured voltage applied to the washer fluid pump divided by the predetermined voltage.

In further features, the display control module is configured to selectively request user input indicative of whether washer fluid has been added to the washer fluid reservoir.

In further features, the display control module is configured to request user input indicative of whether washer fluid has been added to the washer fluid reservoir in response to an indication that a hood of the vehicle is open.

In further features, a hood sensor is configured to monitor whether the hood is open or closed and generate a signal indicative of whether the hood is open or closed.

In further features, the display control module is configured to request user input indicative of whether washer fluid has been added to the washer fluid reservoir in response to an indication that a hood of the vehicle was opened and closed.

In further features: the display control module is configured to, in response to receipt of user input indicating that washer fluid has been added to the washer fluid reservoir, request user input indicative of whether the washer fluid reservoir was completely filled; and the volume module is configured to set the present volume to the predetermined maximum volume in response to receipt of user input indicating that the washer fluid reservoir was completely filled.

In further features: the display control module is configured to, in response to receipt of user input indicating that washer fluid has been added to the washer fluid reservoir, request user input indicative of whether one complete container has been added to the washer fluid reservoir; and the volume module is configured to add a predetermined volume of the one complete container to the present volume in response to receipt of user input indicating that one complete container has been added to the washer fluid reservoir.

In further features, a voltage sensor is configured to measure the measured voltage applied to the washer fluid pump.

In further features, the washer level indicator includes an analog gauge.

In further features, the washer level indicator includes a digital gauge.

In further features, the washer level indicator is displayed on a display.

In further features, the level module is configured to set the present level of washer fluid within the washer fluid reservoir to one of a predetermined set of predetermined levels based on the present volume.

In further features, the predetermined set of predetermined levels includes at least three different predetermined levels.

In a feature, a vehicle system includes: at least one memory including computer executable instructions; at least one processor configured to read and execute the computer executable instructions, the computer executable instructions causing the at least one processor to: determine a present volume of washer fluid present within a washer fluid reservoir; determine a volume of washer fluid dispensed based on a measured voltage applied to a washer fluid pump and a predetermined volumetric flowrate of dispensing washer fluid calibrated based on a predetermined voltage; subtract the volume of washer fluid dispensed from the present volume; determine a present level of washer fluid within the washer fluid reservoir based on the present volume and a predetermined maximum volume of the washer fluid reservoir; and display the present level of washer fluid within the washer fluid reservoir using a washer level indicator.

In a feature, a non-transitory computer readable medium includes computer executable instructions, the computer executable instructions configured to cause a processor to perform a method, the method including: determining a present volume of washer fluid present within a washer fluid reservoir; determining a volume of washer fluid dispensed based on a measured voltage applied to a washer fluid pump and a predetermined volumetric flowrate of dispensing washer fluid calibrated based on a predetermined voltage; subtracting the volume of washer fluid dispensed from the present volume; determining a present level of washer fluid within the washer fluid reservoir based on the present volume and a predetermined maximum volume of the washer fluid reservoir; and displaying the present level of washer fluid within the washer fluid reservoir using a washer level indicator.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A washer fluid pump of a vehicle pumps washer fluid from a washer fluid reservoir to one or more nozzles. For example, the washer fluid pump may pump washer fluid to one or more nozzles in response to receipt of user input (e.g., user actuation of a washer fluid button) or automatically. The nozzles spray the washer fluid onto a windshield of the vehicle (e.g., a front windshield or a rear windshield) or another surface (e.g., of a camera, sensor, etc.).

Some vehicles include a washer fluid level sensor that measures and indicates whether a level of the washer fluid within the washer fluid reservoir is above a predetermined level of the washer fluid level sensor. A control module may illuminate a visual indicator (e.g., a low washer fluid light) or display an indicator on a display when the level of washer fluid is below the level of the predetermined level of the washer fluid sensor. The visual indicator may notify users to add washer fluid to the washer fluid reservoir in advance of the washer fluid reservoir being empty. Other vehicles do not include a washer fluid level sensor and thus may not notify users to add washer fluid to the washer fluid reservoir.

A user opens a hood of the vehicle to add washer fluid to the washer fluid reservoir. Opening the hood may therefore be an indicator that washer fluid may have been added to the washer fluid reservoir.

According to the present disclosure, a washer fluid module determines and updates a present volume of washer fluid within the washer fluid reservoir. When the hood has been opened, the washer fluid module requests user input regarding whether washer fluid has been added to the washer fluid reservoir. If the user indicates that the washer fluid reservoir has been filled, the washer fluid module updates the present volume of washer fluid to a predetermined full volume of the washer fluid reservoir. If the user indicates that one container of washer fluid has been added to the washer fluid reservoir, the washer fluid module sets the present volume by adding a predetermined volume of the container to the present volume of the washer fluid.

The washer fluid module monitors a voltage applied to the washer fluid pump while the washer fluid pump is pumping washer fluid to the nozzle(s). The washer fluid module determines a volume of washer fluid dispensed based on the voltage applied to the washer fluid pump. The washer fluid module updates the present volume by subtracting the volume of washer fluid dispensed from the present volume of washer fluid.

The washer fluid module provides a visual indication of a level of washer fluid within the washer fluid reservoir on a visual indicator, such as a display, a digital gauge, or an analog gauge. The washer fluid module may determine the level of washer fluid based on the present volume of washer fluid relative to the predetermined full volume. This provides the user with real-time information regarding the level of the washer fluid within the washer fluid reservoir. Costs associated with sensors that measure washer fluid level are also avoided.

Figure 1:
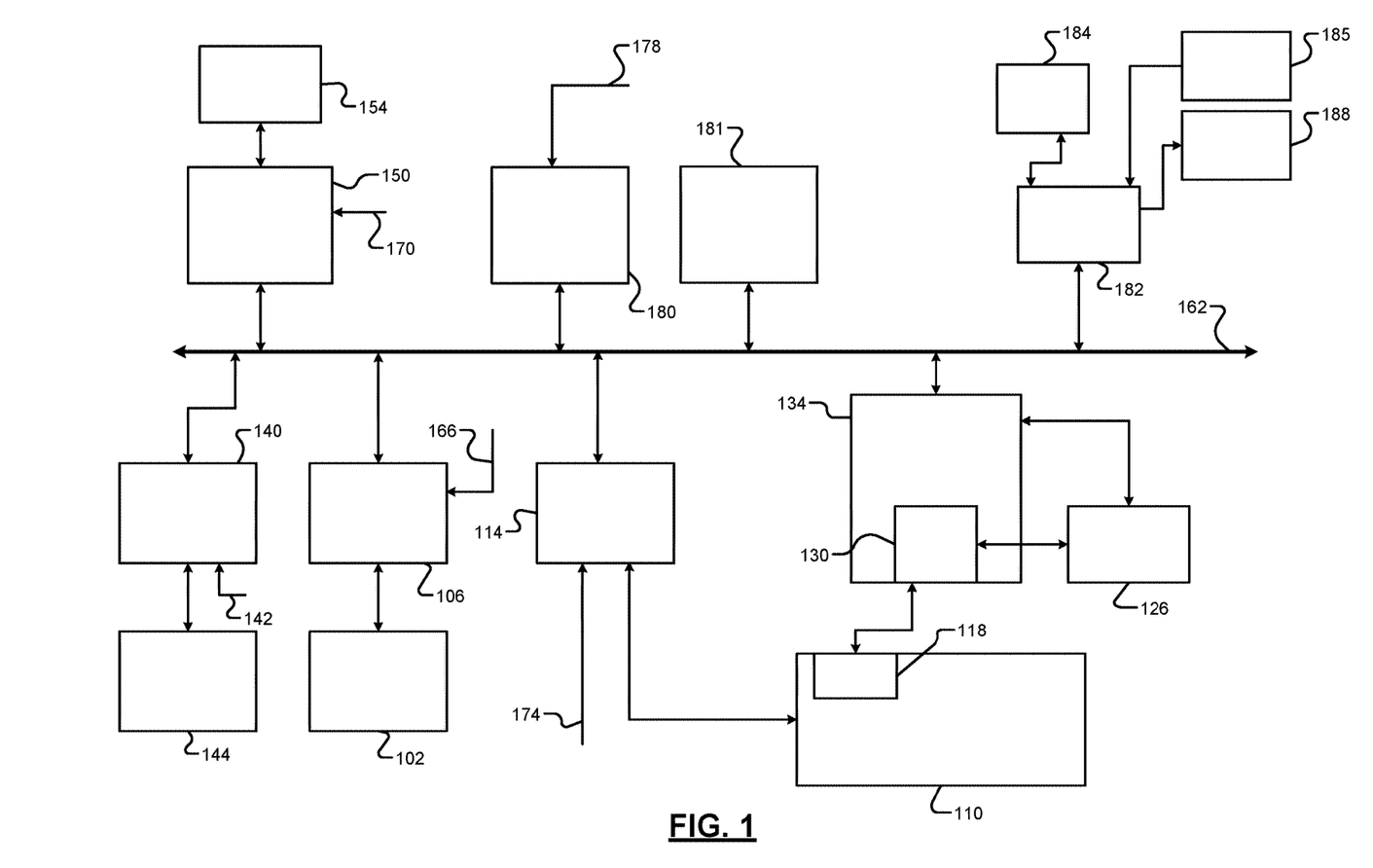
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to non-hybrid vehicles, electric vehicles, fuel cell vehicles. The present disclosure is applicable to autonomous vehicles, semi-autonomous vehicles, non-autonomous vehicles, and other types of vehicles.

An engine 102 combusts an air/fuel mixture to generate drive torque. An engine control module (ECM) 106 controls the engine 102 based on a torque request, such as a torque request determined based on one or more driver inputs. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter control module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as a power inverter module (PIM) in various implementations.

A steering control module 140 controls steering/turning of wheels of the vehicle, for example, based on driver turning of a steering wheel within the vehicle and/or steering commands from one or more vehicle modules. A steering wheel angle sensor (SWA) monitors rotational position of the steering wheel and generates a SWA 142 based on the position of the steering wheel. As an example, the steering control module 140 may control vehicle steering via an electronic power steering (EPS) motor 144 based on the SWA 142. However, the vehicle may include another type of steering system. An electronic brake control module (EBCM) 150 may selectively control brakes 154 of the vehicle.

Modules of the vehicle may share parameters via a network 162, such as a controller area network (CAN). In vehicles, CAN may also stand for car area network. The network 162 may include one or more data buses. Various parameters may be made available by a given control module to other control modules via the network 162.

The driver inputs may include, for example, an accelerator pedal position (APP) 166 which may be provided to the ECM 106. A brake pedal position (BPP) 170 may be provided to the EBCM 150. A position 174 of a range selector, such as a park, reverse, neutral, drive lever (PRNDL), may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

The vehicle may also include one or more other sensors 181. Examples of the other sensors 181 include, for example, one or more laser imaging distancing and ranging (LIDAR) sensors, one or more radar sensors, one or more cameras, and one or more sonar sensors. One or more control modules may control respective devices based on input from one or more of the one or more other sensors 181. For example, based on input from one or more of the one or more other sensors 181, the ECM 106 may control the engine 102, the steering control module 140 may control the EPS motor 144, and/or the EBCM 150 may control the brakes 154.

The vehicle system also includes an infotainment module 182. The infotainment module 182 controls what is displayed on a display 184. The display 184 may be a touchscreen display in various implementations and transmit signals indicative of user input to the display 184 to the infotainment module 182. The Infotainment module 182 may additionally or alternatively receive signals indicative of user input from one or more other user input devices 185, such as one or more switches, buttons, knobs, etc.

The infotainment module 182 may also generate output via one or more other devices. For example, the infotainment module 182 may output sound via one or more speakers 188 of the vehicle. The vehicle may include one or more additional control modules that are not shown, such as a chassis control module, a battery pack control module, etc. The vehicle may omit one or more of the control modules shown and discussed.

Figure 2:
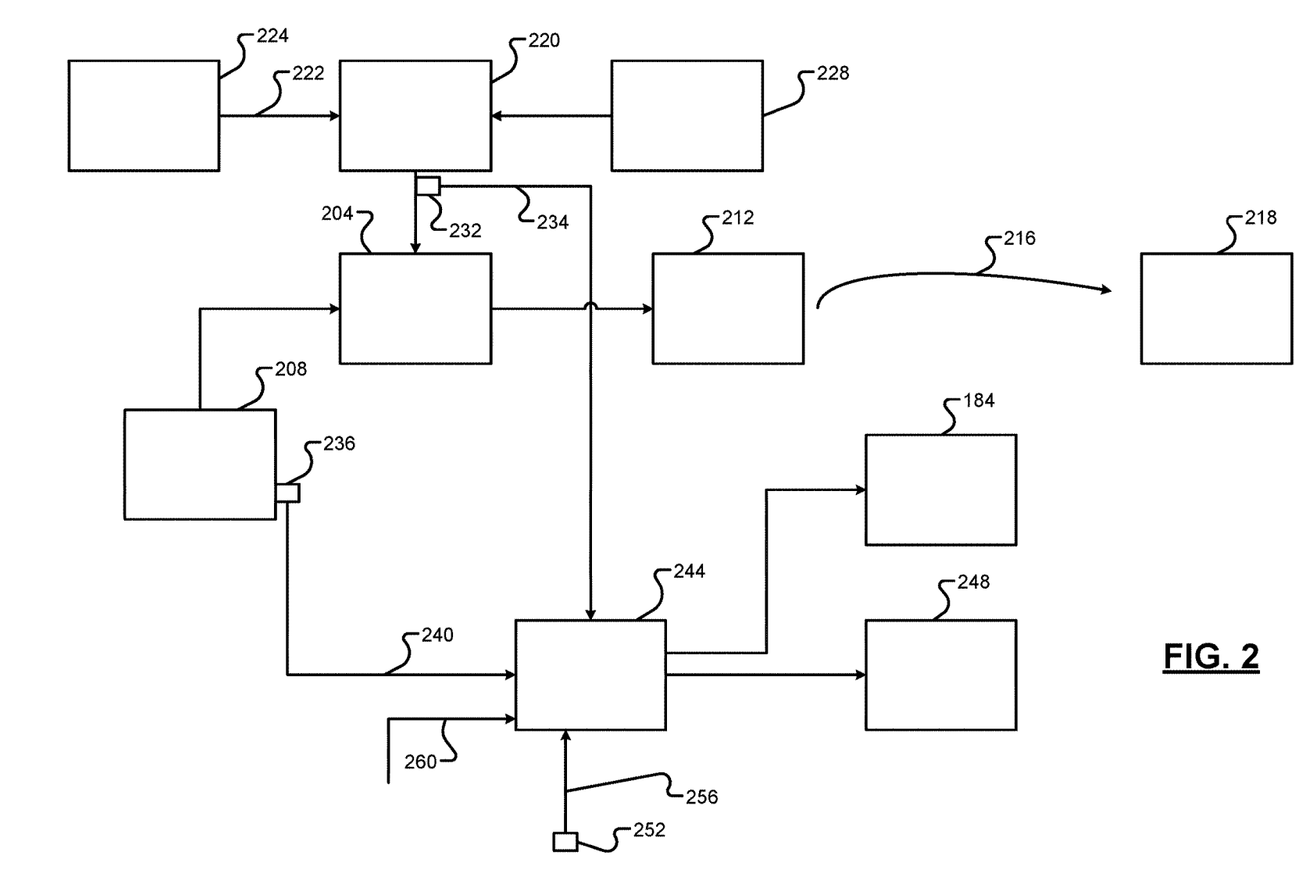
FIG. 2 is a functional block diagram of an example washer fluid level display system.

FIG. 2 is a functional block diagram of an example implementation of a washer fluid level display system. When power is applied to a washer fluid pump 204, the washer fluid pump 204 draws washer fluid from a washer fluid reservoir 208 and pumps the washer fluid to one or more washer fluid nozzles 212. The washer fluid nozzles 212 spray received washer fluid onto a surface as illustrated by 216. An example of surface includes a windshield 218, such as a front windshield of the vehicle or a rear windshield of the vehicle. Other example surfaces include transparent surfaces through which one or more cameras capture images, surfaces of sensors (e.g., LIDAR sensors, etc.), and other surfaces.

A pump control module 220 applies power to the washer fluid pump 204. For example, the pump control module 220 may apply power to the washer fluid pump 204 based on user input (e.g., actuation or touching) 222 to a washer fluid input 224. As another example, the pump control module 220 may apply power to the washer fluid pump 204 automatically without user input (e.g., for a camera, sensor, or windshield). The pump control module 220 applies power to the washer fluid pump 204 from a battery 228. Specifically, the pump control module 220 applies the voltage of the battery 228 to the washer fluid pump 204. The pump control module 220 disconnects the battery 228 from the washer fluid pump 204 when washer fluid is not to be pumped.

The battery 228 may be recharged by an alternator and/or one or more electric motors, such as the electric motor 118. The voltage applied to the washer fluid pump 204 therefore varies as the battery 228 is charged and discharged. The voltage applied to the washer fluid pump 204 varies a volumetric flowrate of the washer fluid pump 204 and, therefore, a volumetric flowrate of washer fluid through the nozzle(s) 212. The volumetric flowrate of washer fluid through the washer fluid nozzle(s) 212 is less than the volumetric flowrate of the washer fluid pump 204.

A voltage sensor 232 measures a voltage 234 applied to the washer fluid pump 204. A level sensor 236 may be implemented to measure whether a level of washer fluid within the washer fluid reservoir 208 is greater than a predetermined level of the level sensor 236. For example, the level sensor 236 may set a level signal 240 to a first state when the washer fluid level is greater than the predetermined level of the level sensor 236. The level sensor 236 may set the level signal 240 to a second state when the washer fluid level is less than the predetermined level of the level sensor 236. In various implementations, the level sensor 236 may be omitted.

A washer fluid module 244 displays a level of the washer fluid within the washer fluid reservoir 208 using a washer fluid level indicator 248. The washer fluid level indicator 248 may be, for example, an analog or digital gauge. In various implementations, the washer fluid module 244 may display the level of washer fluid within the washer fluid reservoir 208 on the display 184.

The washer fluid reservoir 208 is accessible under a hood of the vehicle. A user can therefore add washer fluid to the washer fluid reservoir 208 via opening the hood. Washer fluid may be sold in one or more types of containers having one or more predetermined volumes. Addition of washer fluid to the washer fluid reservoir 208 may be one common reason for users opening hoods of vehicles. A hood sensor 252 monitors and indicates whether the hood is open or closed. For example, the hood sensor 252 may set a hood signal 256 to a first state when the hood is open and set the hood signal 256 to a second state when the hood is closed.

When the hood of the vehicle is opened and later closed, the washer fluid module 244 requests user input regarding whether washer fluid was added to the washer fluid reservoir 208. For example, the washer fluid module 244 may display a predetermined message on the display 184 requesting user input regarding whether washer fluid was added to the washer fluid reservoir 208.

If user input is received indicating that washer fluid was added to the washer fluid reservoir 208, the washer fluid module 244 may request user input regarding whether the washer fluid reservoir 208 was completely filled or if a complete container (having a predetermined volume) of washer fluid was added to the washer fluid reservoir 208. If user input is received indicating that the washer fluid reservoir 208 was completely filled, the washer fluid module 244 sets a present volume of washer fluid within the washer fluid reservoir 208 to a predetermined maximum volume of washer fluid. If user input is received indicating that a complete container (having a predetermined volume) of washer fluid was added to the washer fluid reservoir 208, the washer fluid module 244 adds the predetermined volume to the present volume of washer fluid within the washer fluid reservoir 208 to update the present volume.

The user input indicative of whether washer fluid was added to the washer fluid reservoir 208 and whether the washer fluid reservoir 208 was completely filled or if a complete container (having a predetermined volume) of washer fluid was added to the washer fluid reservoir 208 is collectively illustrated by 260. The user input may be generated, for example, by the display 184 in response to user input (e.g., actuation or touching) to the display and/or one or more other user input devices in response to user input (e.g., actuation or touching) of the one or more other user input devices.

Each time that the washer fluid pump 204 is used, the washer fluid module 244 determines a volume of washer fluid dispensed based on the voltage 234 applied to the washer fluid pump 204, a predetermined volumetric flowrate profile through the nozzles(s) 212 calibrated based on a predetermined voltage, and a predetermined size of the nozzle(s) 212. Because the predetermined volumetric flowrate profile is calibrated based on the predetermined voltage and the volumetric flowrate of the washer fluid pump 204 (and therefore the flowrate through the nozzle(s) 212) varies with the voltage 234 applied to the washer fluid pump 204, the voltage 234 is used to more accurately determine the volume of washer fluid dispensed. Different washer fluid pumps may be used for different vehicles. Different washer fluid pumps have different volumetric flowrate profiles. The washer fluid module 244 subtracts the volume of washer fluid dispensed from the present volume of washer fluid within the washer fluid reservoir 208 to update the present volume. The washer fluid module 244 determines the level of washer fluid within the washer fluid reservoir 208 based on the present volume relative to the predetermined maximum volume of washer fluid. The washer fluid module 244 may be implemented independently or within another module, such as the BCM 180 or another module.

Figure 3:
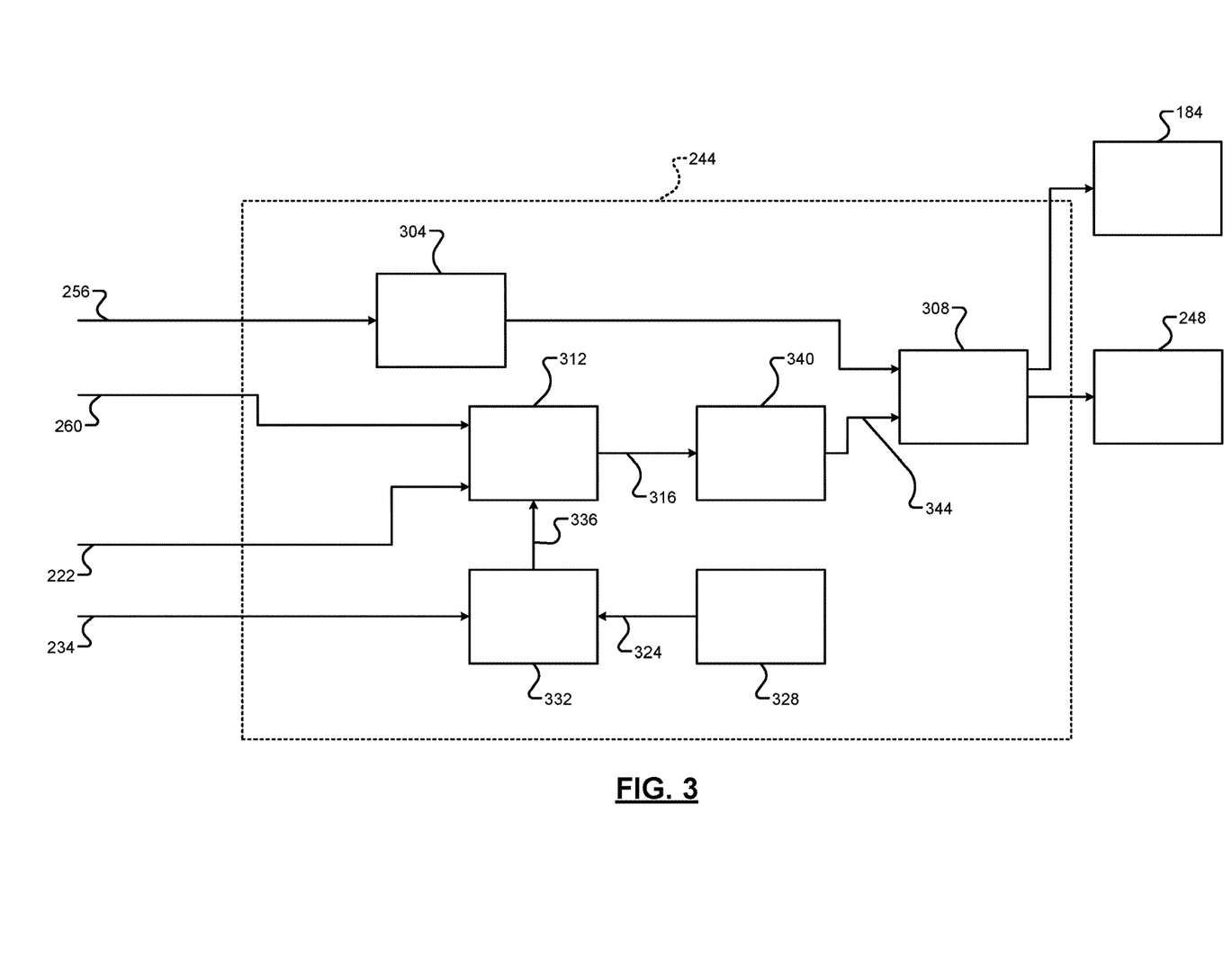
FIG. 3 is a functional block diagram of an example implementation of a washer fluid module.

FIG. 3 is a functional block diagram of an example implementation of the washer fluid module 244. A triggering module 304 triggers a display control module 308 to request user input regarding whether washer fluid was added to the washer fluid reservoir 208. For example, when triggered, the display control module 308 may display a predetermined message on the display 184 requesting user input regarding whether washer fluid was added to the washer fluid reservoir 208. The triggering module 304 triggers the display control module 308 when the hood signal 256 transitions from the second state to the first state and from the first state back to the second state. Otherwise, the triggering module 304 may not trigger the display control module 308. If the vehicle is off (e.g., the ignition state 178 is off) when the hood signal 256 transitions from the second state to the first state and from the first state back to the second state, the triggering module 304 may trigger the display control module 308 when the ignition state 178 next transitions to one of crank, run, or accessory.

If user input is received indicating that washer fluid was added to the washer fluid reservoir 208, the display control module 308 requests user input regarding whether the washer fluid reservoir 208 was completely filled or if a complete container (having a predetermined volume) of washer fluid was added to the washer fluid reservoir 208. For example, the display control module 308 may display a predetermined message on the display 184 requesting user input regarding whether the washer fluid reservoir 208 was completely filled or if a complete container (having a predetermined volume) of washer fluid was added to the washer fluid reservoir 208.

A volume module 312 determines a present volume 316 of washer fluid within the washer fluid reservoir 208. If user input is received indicating that the washer fluid reservoir 208 was completely filled, the volume module 312 sets the present volume 316 to the predetermined maximum volume of washer fluid. If user input is received indicating that a complete container (having a predetermined volume) of washer fluid was added to the washer fluid reservoir 208, the volume module 312 adds the predetermined volume to the present volume 316 to update the present volume 316.

If no user input is received or user input is received indicating that neither the washer fluid reservoir 208 was completely filled nor a complete container (having a predetermined volume) of washer fluid was added to the washer fluid reservoir 208, the volume module 312 may leave the present volume 316 unchanged. Also, if user input is received indicating that washer fluid was not added to the washer fluid reservoir 208, the volume module 312 may leave the present volume 316 unchanged.

The pump control module 220 applies power to the washer fluid pump 204 from the battery 228 to dispense washer fluid through the nozzle(s) 212 (e.g., automatically or when the user input 222 is received indicative of user input to the washer fluid input 224). When power is applied to the washer fluid pump 204 is received, the volume module 312 resets a timer value, such as to zero. A timer increments the timer value as time passes after the resetting.

The volumetric flowrate of washer fluid through the nozzle(s) 212 exhibited over time follows the shape of a predetermined volumetric flowrate profile. The predetermined volumetric flowrate profile is stored in memory, such as memory 328. The volumetric flowrate of washer fluid through the nozzle(s) 212 depends on the volumetric flowrate of the washer fluid pump 204 and the predetermined size(s) of the nozzle(s) 212.

Figure 4A:
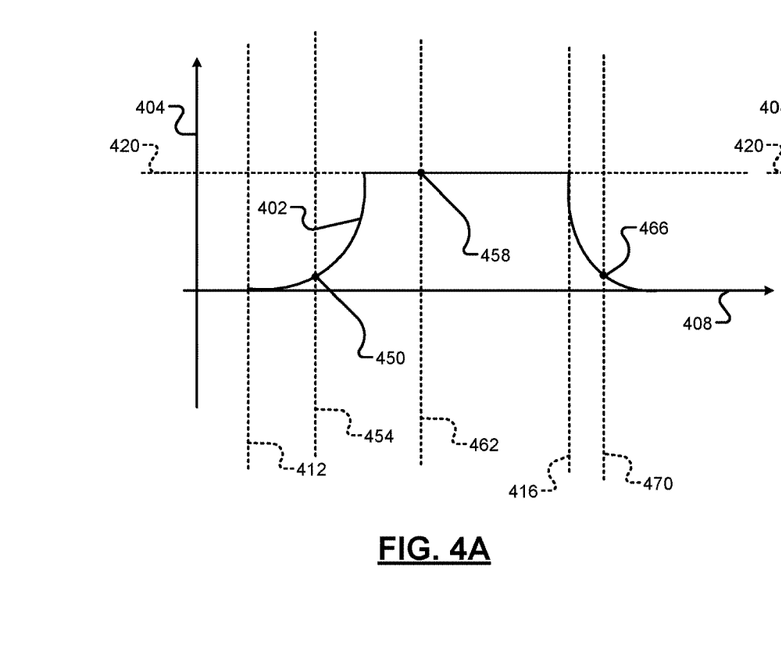
FIGS. 4A and 4B are example graphs of volumetric flowrate through one or more washer fluid nozzles over time.

FIG. 4A includes an example graph including an example of a predetermined volumetric flowrate profile 402. In FIG. 4A, volumetric flowrate is plotted on the Y-axis 404 and time is plotted along the X-axis 408. Generally speaking, the volumetric flowrate through the nozzle(s) 212 increases up to a predetermined maximum flowrate. The increase may be non-linear. The example of FIG. 4A illustrates power being applied to the washer fluid pump 204 beginning at time 408 and being maintained until time 416. An example of the predetermined maximum flowrate is illustrated by 420.

Once the volumetric flowrate reaches the predetermined maximum flowrate, the volumetric flowrate stays at the predetermined maximum flowrate until the washer fluid pump 204 is disconnected from power and power is no longer applied to the washer fluid pump 204. The example of FIG. 4A illustrates the washer fluid pump 204 being disconnected from power at time 416. When the washer fluid pump 204 is disconnected from power, the volumetric flowrate through the nozzle(s) 212 decreases to zero as the washer fluid pump 204 slows to a stop due to stoppage of the application of power to the washer fluid pump 204. The decrease may be non-linear.

Figure 4B:
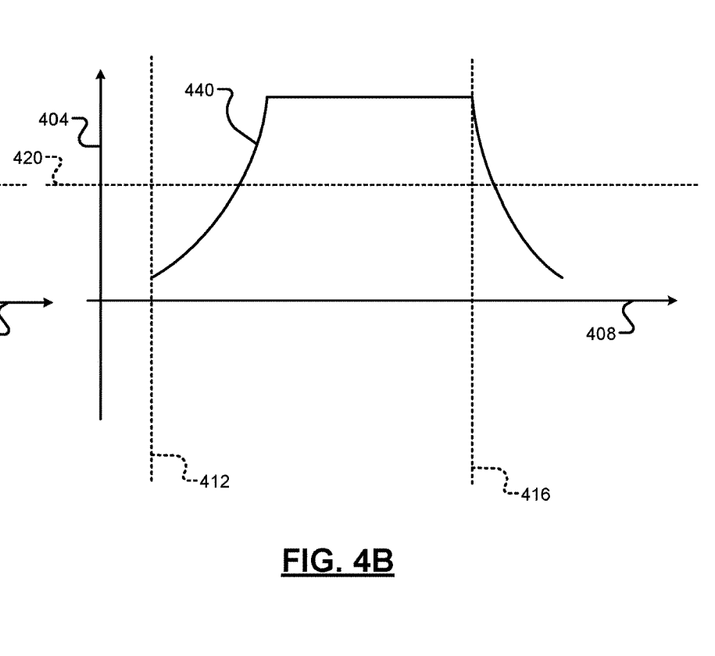

The predetermined volumetric flowrate profile, however, is calibrated based on a predetermined voltage being applied to the washer fluid pump 204. As discussed above, the volumetric flowrate of the washer fluid pump 204 (and therefore the volumetric flowrate through the nozzle(s) 212) varies with the voltage 234 applied to the washer fluid pump 204. For example, when a voltage that is greater than the predetermined voltage is applied to the washer fluid pump 204, the volumetric flowrate profile through the nozzle(s) 212 over time may follow example volumetric flowrate 440 of FIG. 4B.

Referring back to FIG. 3, a flowrate module 332 determines a present volumetric flowrate 336 through the nozzle(s) 212 based on a voltage scalar and a predetermined volumetric flowrate 324 at that time determined from the predetermined volumetric flowrate profile. More specifically, the flowrate module 332 selects the predetermined volumetric flowrate 324 at the time (given the timer value and the user input 222) from the predetermined volumetric flowrate profile. For example, in the example of FIG. 4A, the flowrate module 332 may select predetermined volumetric flowrate 450 when the timer value corresponds to time 454. The flowrate module 332 may select the predetermined volumetric flowrate 458 when the timer value corresponds to time 462. The flowrate module 332 may select the predetermined volumetric flowrate 466 when the timer value corresponds to time 470 after the washer fluid pump 204 is disconnected from power (at time 416).

The flowrate module 332 may set the present volumetric flowrate 336 based on or equal to the predetermined volumetric flowrate multiplied by the voltage scalar. The flowrate module 332 determines the voltage scalar based on the voltage 234 and the predetermined voltage based upon which the predetermined volumetric flowrate profile is calibrated. The flowrate module 332 may determine the voltage scalar using one of an equation and a lookup table that relates voltages to voltage scalars. For example, the flowrate module 332 may set the voltage scalar based on or equal to the voltage 234 divided by the predetermined voltage. Under some circumstances, the voltage 234 may change while the washer fluid pump 204 is spinning. The flowrate module 332 will therefore adjust the voltage scalar and account for changes in the voltage 234.

When power is applied to the washer fluid pump 204, the volume module 312 may determine a total volume of washer fluid dispensed. Specifically, the volume module 312 determines a partial volume dispensed each time interval by determining a mathematical integral of the present volumetric flowrate 336 with respect to time. The volume module 312 may sum the partial volumes to determine the total volume dispensed. The volume module 312 subtracts the total volume dispensed from the present volume 316 to update the present volume 316. Alternatively, the volume module 312 may subtract the partial volumes from the present volume 316 to update the present volume 316.

A level module 340 determines a present level 344 of washer fluid within the washer fluid reservoir 208 based on the present volume 316 and the predetermined maximum volume of washer fluid. The level module 340 may set the present level 344 using one of an equation and a lookup table that relates present volumes to present levels. For example, the level module 340 may set the present level 344 based on or equal to the present volume 316 divided by the predetermined maximum volume.

The display control module 308 displays the present level 344 of the washer fluid within the washer fluid reservoir 208 using the washer fluid level indicator 248. As stated above, the washer fluid level indicator 248 may be, for example, an analog or digital gauge. In various implementations, the display control module 308 may display the present level 344 on the display 184. In various implementations, the display control module 308 may generate a visual indicator (e.g., on the display 184 or illuminate a light) when the present level 344 is less than a predetermined level. The display control module 308 may not generate the visual indicator when the present level 344 is greater than the predetermined level.

In various implementations, the display control module 308 may display the present level 344 as corresponding to one of a predetermined number of discrete levels, such as 3, 4, 5, or 6 discrete levels. The display control module 308 may determine which one of the discrete levels to display based on the present level 344 relative to predetermined thresholds.

For example, the display control module 308 may display the present level 344 as a first level (e.g., low) when the present level is less than a first predetermined value. The display control module 308 may display the present level 344 as a second level (e.g., medium) when the present level 344 is greater than the first predetermined value and less than a second predetermined value. The display control module 308 may display the present level 344 as a third level (e.g., high) when the present level 344 is greater than the second predetermined value.

As another example, the display control module 308 may display the present level 344 as a first level when the present level is less than a first predetermined value. The display control module 308 may display the present level 344 as a second level (that is greater than the first level) when the present level 344 is greater than the first predetermined value and less than a second predetermined value. The display control module 308 may display the present level 344 as a third level (that is greater than the second level) when the present level 344 is greater than the second predetermined value and less than a third predetermined value. The display control module 308 may display the present level 344 as a fourth level (that is greater than the third level) when the present level 344 is greater than the third predetermined value. While the examples of three and four discrete levels have been provided, the present application is also applicable to two discrete levels and more than 4 discrete levels.

Figure 5A:
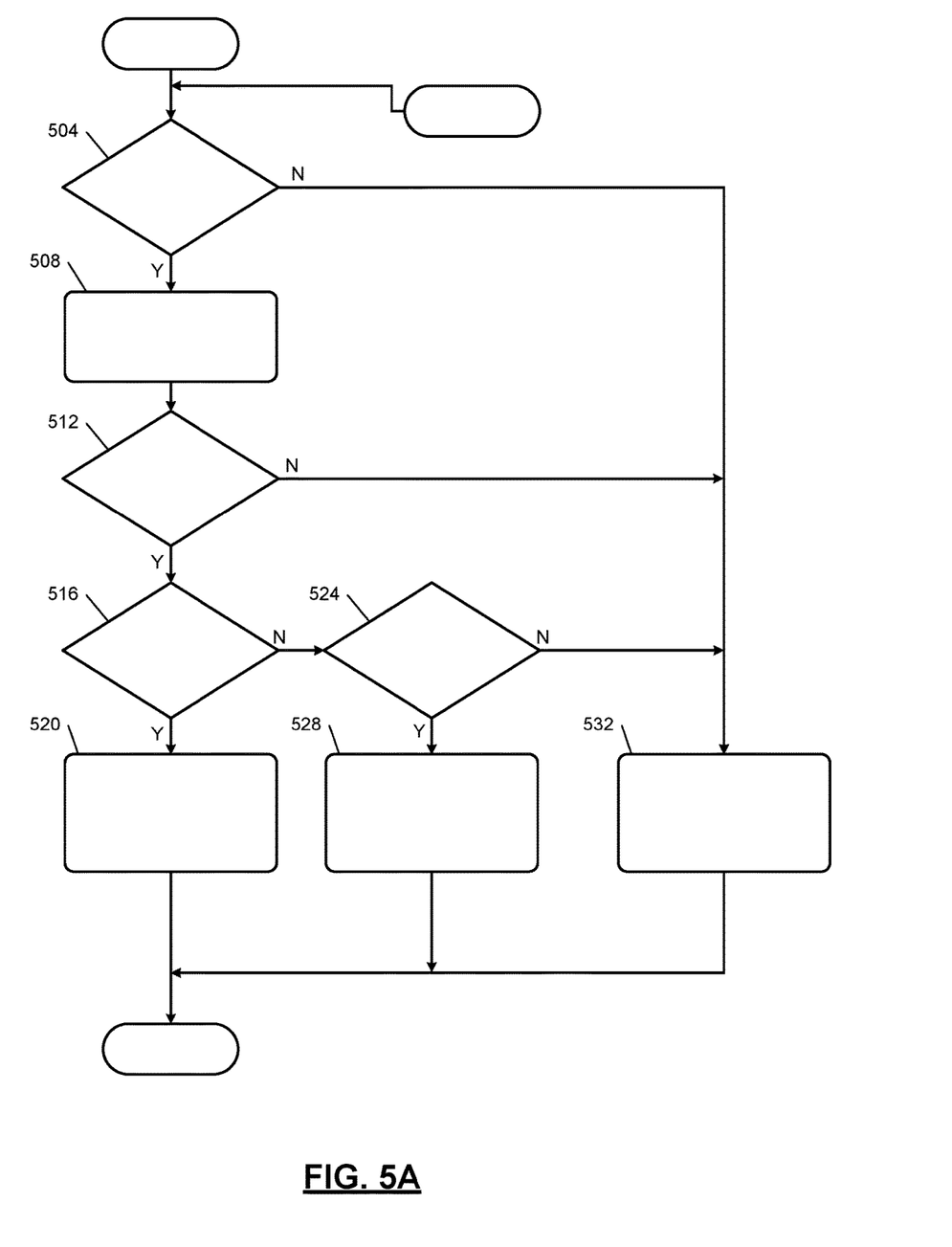
FIGS. 5A-5B include a flowchart depicting an example method of determining and displaying a washer fluid level.
Figure 5B:
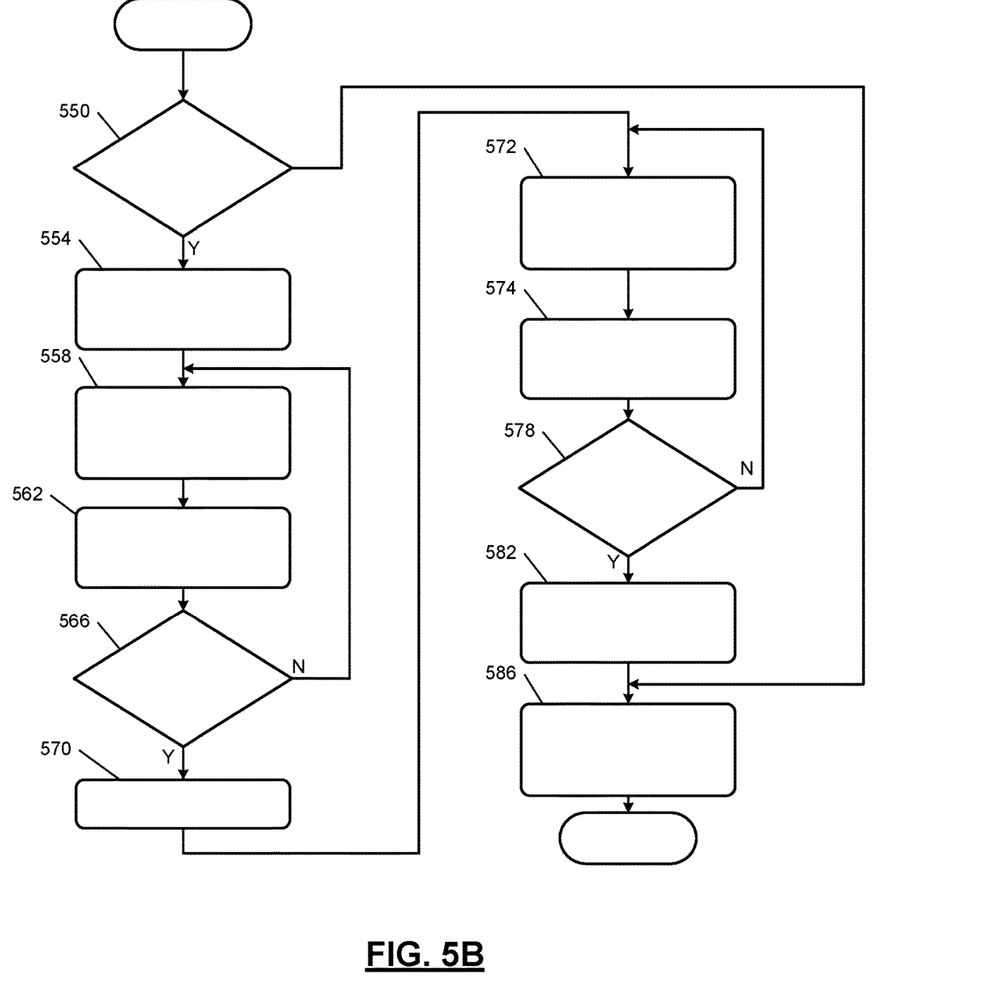

FIGS. 5A and 5B are flowcharts depicting an example method of determining and displaying the present level 344 of washer fluid within the washer fluid reservoir 208. Control begins when the vehicle is on (e.g., the ignition state 178 is in the run, crank, or accessory state). Control begins with 504 where the triggering module 304 determines whether the hood of the vehicle has been opened and closed. If 504 is true, the triggering module 304 triggers the display control module 308 and control continues with 508. If 504 is false, the triggering module 304 does not trigger the display control module 308 and control transfers to 532, which is discussed further below.

At 508, the display control module 308 requests user input regarding whether washer fluid was added to the washer fluid reservoir 208. For example, the display control module 308 may display a predetermined message on the display 184 requesting user input regarding whether washer fluid was added to the washer fluid reservoir 208.

The volume module 312 determines whether user input has been received indicating that washer fluid has been added to the washer fluid reservoir 208 at 512. If 512 is true, control continues with 516. If 512 is false, control transfers to 532, which is discussed further below.

At 516, the volume module 312 may determine whether user input has been received indicating that the washer fluid reservoir 208 has been completely filled. If 516 is true, the volume module 312 sets the present volume 316 to the predetermined maximum volume at 520, and control continues with 550 of FIG. 5B, which is discussed further below. If 520 is false, control transfers to 524.

The volume module 312 may determine whether user input has been received indicating that a complete container (having a predetermined volume) of washer fluid was added to the washer fluid reservoir 208 at 524. If 524 is true, the volume module 312 adds the predetermined volume to the previous value of the present volume at 528, and control continues with 550 of FIG. 5B, which is discussed further below. If 524 is false, control transfers to 532. The volume module 312 may leave the present volume 316 unchanged at 532, and control continues with 550 of FIG. 5B.

At 550 (FIG. 5B), the volume module 312 and the pump control module 220 determine whether to apply power to the washer fluid pump 204 (e.g., whether the user input 222 is being received or another request to pump washer fluid has been received). If 550 is false, control may continue with 586, as discussed further below. If 550 is true, the volume module 312 resets the timer value to zero, and control continues with 554. At 554, the pump control module 220 applies power from the battery 228 to the washer fluid pump 204. Washer fluid is therefore drawn from the washer fluid reservoir 208 and dispensed onto the surface, such as the windshield 218, via the nozzle(s) 212.

The flowrate module 332 determines the voltage 234 applied to the washer fluid pump 204 at 558. The voltage sensor 232 measures the voltage 234 applied to the washer fluid pump 204. The flowrate module 332 also determines the present volumetric flowrate 336 through the nozzle(s) 212 at 558 based on the predetermined volumetric flowrate 324 at the time of the timer value and the voltage scalar. The flowrate module 332 determines the voltage scalar based on the voltage 234 and the predetermined voltage.

At 562, the volume module 312 determines a partial volume dispensed by determining a mathematical integral of the present volumetric flowrate 336 with respect to time. The volume module 312 adds the partial volume dispensed to a total volume dispensed at 562. At 566, the volume module 312 and the pump control module 220 determine whether to disconnect the washer fluid pump 204 from power (e.g., whether the user input 222 is not being received). If 566 is true, control continues with 570. If 566 is false, control may return to 558.

The pump control module 220 disconnects the washer fluid pump 204 from the battery 228 at 570. At 572, the flowrate module 332 determine the present volumetric flowrate 336 based on the predetermined volumetric flowrate 324 during the decrease given the period since the washer fluid pump 204 was disconnected from power and the voltage scalar from immediately before the power was disconnected. At 574, the volume module 312 determines a partial volume dispensed by determining a mathematical integral of the present volumetric flowrate 336 with respect to time. The volume module 312 adds the partial volume dispensed to a total volume dispensed at 574.

At 578, the volume module 312 determines whether partial volume dispensed (determined at 574) is zero. If 578 is true, control continues with 582. If 578 is false, control may return to 572. At 582, the volume module 312 subtracts the total volume dispensed from the previous value of the present volume 316. While the example of subtracting the total volume dispensed has been provided, alternatively each partial volume dispensed can be subtracted from the present volume 316. At 586, the level module 340 determines the present level 344 of washer fluid within the washer fluid reservoir 208 based on the present volume 316 and the predetermined maximum volume. The display control module 308 displays the present level 344 using the washer fluid level indicator 248 and/or the display 184 at 586, and control returns to 504.

While the example of the nozzle(s) 212 dispensing washer fluid onto one surface is provided, as discussed above, washer fluid may be dispensed onto multiple surfaces using different nozzle(s). The volume module 312 determines the present volume 316, as described above, when washer fluid is dispensed from other nozzle(s).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A washer fluid level indication system of a vehicle, comprising:
    a volume module configured to determine a present volume of washer fluid present within a washer fluid reservoir;
    a flowrate module configured to determine a volume of washer fluid dispensed based on a measured voltage applied to a washer fluid pump and a predetermined volumetric flowrate of dispensing washer fluid calibrated based on a predetermined voltage,
    wherein the flowrate module is configured to subtract the volume of washer fluid dispensed from the present volume;
    a level module configured to determine a present level of washer fluid within the washer fluid reservoir based on the present volume and a predetermined maximum volume of the washer fluid reservoir; and
    a display control module configured to display the present level of washer fluid within the washer fluid reservoir using a washer level indicator.

2. The washer fluid level indication system of claim 1 wherein the flowrate module is configured to:

determine a present volumetric flowrate of washer fluid being dispensed based on the measured voltage applied to the washer fluid pump, the predetermined volumetric flowrate, and the predetermined voltage; and determine the volume of washer fluid dispensed based on the present volumetric flowrate.

3. The washer fluid level indication system of claim 2 wherein the flowrate module is configured to determine the volume of washer fluid dispensed based on a mathematical integral of the present volumetric flowrate with respect to time.

4. The washer fluid level indication system of claim 2 wherein the flowrate module is configured to:
    determine a voltage scalar based on the measured voltage applied to the washer fluid pump and the predetermined voltage; and
    determine the present volumetric flowrate as a function of the predetermined volumetric flowrate and the voltage scalar.

5. The washer fluid level indication system of claim 4 wherein the flowrate module is configured to set the present volumetric flowrate based on the predetermined volumetric flowrate multiplied by the voltage scalar.

6. The washer fluid level indication system of claim 4 wherein the flowrate module is configured to set the voltage scalar based on the measured voltage applied to the washer fluid pump divided by the predetermined voltage.

7. The washer fluid level indication system of claim 1 wherein the display control module is configured to selectively request user input indicative of whether washer fluid has been added to the washer fluid reservoir.

8. The washer fluid level indication system of claim 7 wherein the display control module is configured to request user input indicative of whether washer fluid has been added to the washer fluid reservoir in response to an indication that a hood of the vehicle is open.

9. The washer fluid level indication system of claim 8 further comprising a hood sensor configured to monitor whether the hood is open or closed and generate a signal indicative of whether the hood is open or closed.

10. The washer fluid level indication system of claim 7 wherein the display control module is configured to request user input indicative of whether washer fluid has been added to the washer fluid reservoir in response to an indication that a hood of the vehicle was opened and closed.

11. The washer fluid level indication system of claim 7 wherein:
    the display control module is configured to, in response to receipt of user input indicating that washer fluid has been added to the washer fluid reservoir, request user input indicative of whether the washer fluid reservoir was completely filled; and
    the volume module is configured to set the present volume to the predetermined maximum volume in response to receipt of user input indicating that the washer fluid reservoir was completely filled.

12. The washer fluid level indication system of claim 7 wherein:
    the display control module is configured to, in response to receipt of user input indicating that washer fluid has been added to the washer fluid reservoir, request user input indicative of whether one complete container has been added to the washer fluid reservoir; and
    the volume module is configured to add a predetermined volume of the one complete container to the present volume in response to receipt of user input indicating that one complete container has been added to the washer fluid reservoir.

13. The washer fluid level indication system of claim 1 further comprising a voltage sensor configured to measure the measured voltage applied to the washer fluid pump.

14. The washer fluid level indication system of claim 1 wherein the washer level indicator includes an analog gauge.

15. The washer fluid level indication system of claim 1 wherein the washer level indicator includes a digital gauge.

16. The washer fluid level indication system of claim 1 wherein the washer level indicator is displayed on a display.

17. The washer fluid level indication system of claim 1 wherein the level module is configured to set the present level of washer fluid within the washer fluid reservoir to one of a predetermined set of predetermined levels based on the present volume.

18. The washer fluid level indication system of claim 17 wherein the predetermined set of predetermined levels includes at least three different predetermined levels.

19. A vehicle system, comprising:
    at least one memory comprising computer executable instructions;
    at least one processor configured to read and execute the computer executable instructions, the computer executable instructions causing the at least one processor to:
        determine a present volume of washer fluid present within a washer fluid reservoir;
        determine a volume of washer fluid dispensed based on a measured voltage applied to a washer fluid pump and a predetermined volumetric flowrate of dispensing washer fluid calibrated based on a predetermined voltage;
        subtract the volume of washer fluid dispensed from the present volume;
        determine a present level of washer fluid within the washer fluid reservoir based on the present volume and a predetermined maximum volume of the washer fluid reservoir; and
        display the present level of washer fluid within the washer fluid reservoir using a washer level indicator.

20. A non-transitory computer readable medium comprising computer executable instructions, the computer executable instructions configured to cause a processor to perform a method, the method comprising:
    determining a present volume of washer fluid present within a washer fluid reservoir;
    determining a volume of washer fluid dispensed based on a measured voltage applied to a washer fluid pump and a predetermined volumetric flowrate of dispensing washer fluid calibrated based on a predetermined voltage;
    subtracting the volume of washer fluid dispensed from the present volume;
    determining a present level of washer fluid within the washer fluid reservoir based on the present volume and a predetermined maximum volume of the washer fluid reservoir; and
    displaying the present level of washer fluid within the washer fluid reservoir using a washer level indicator.

* * * * *